United States Patent Office 3,363,734
Patented Jan. 16, 1968

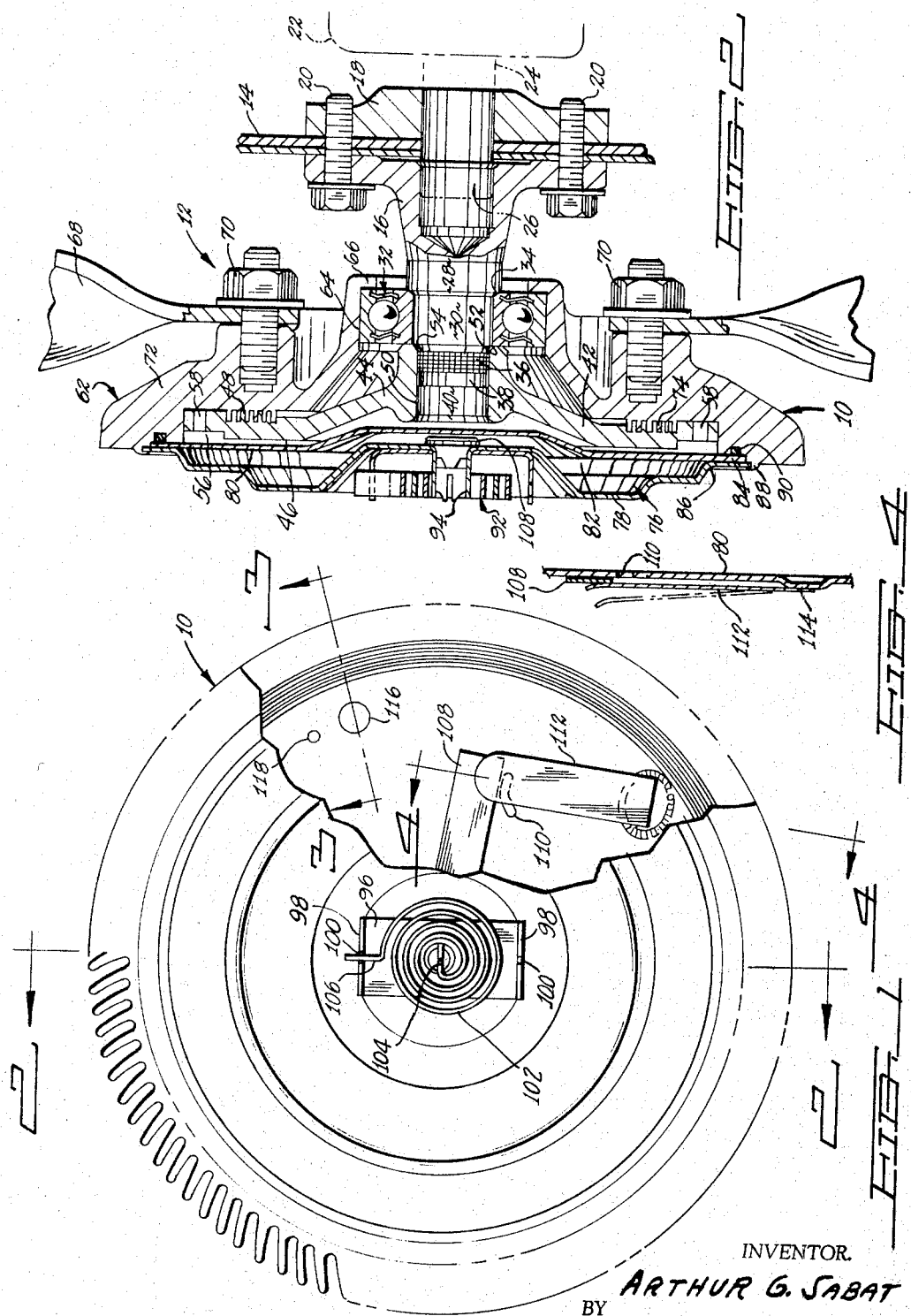

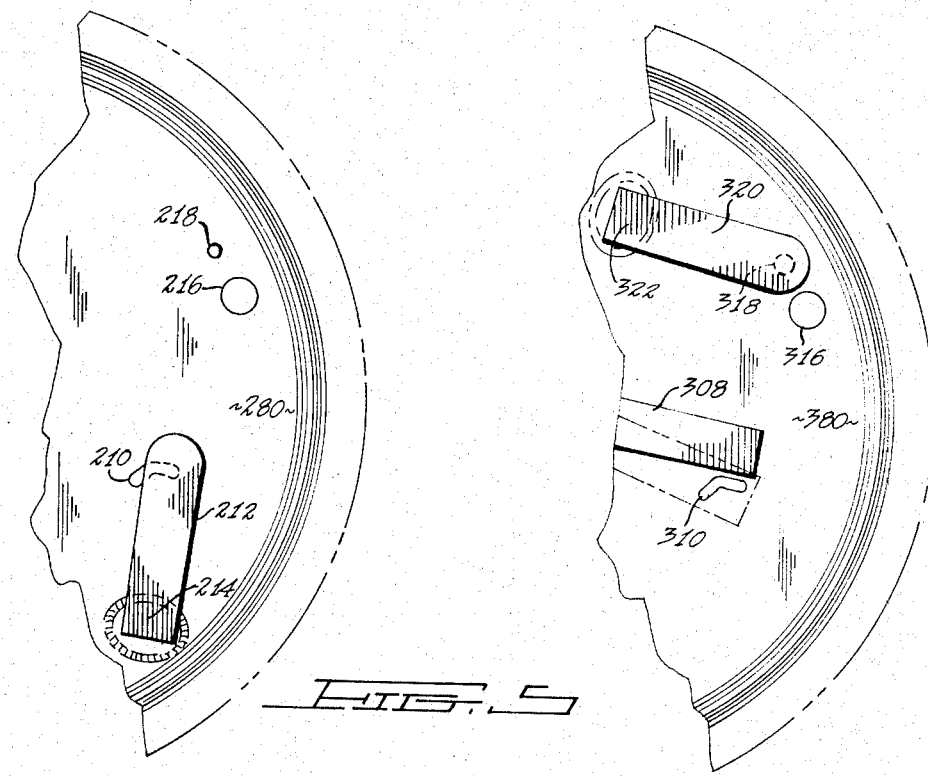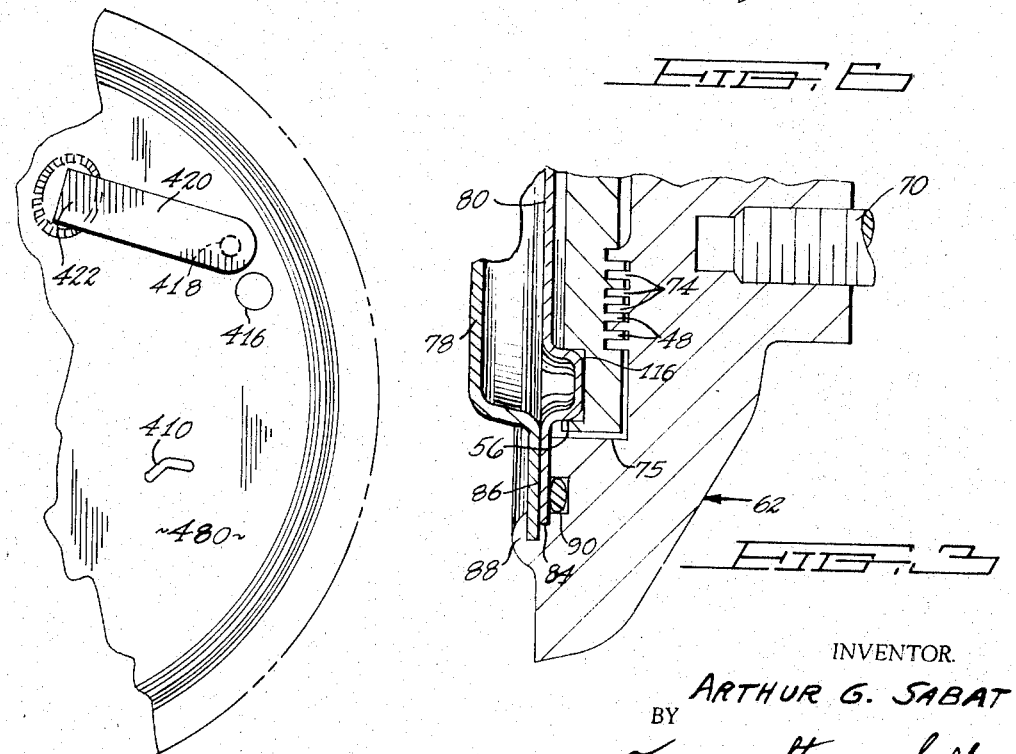

3,363,734
TEMPERATURE RESPONSIVE FLUID CLUTCH
Arthur G. Sabat, East Detroit, Mich., assignor to Eaton Yale & Towne Inc., a corporation of Ohio
Filed Sept. 17, 1962, Ser. No. 223,938
14 Claims. (Cl. 192—58)

This invention relates to a viscous shear fluid type power transmitting coupling wherein the viscous fluid is adapted to be transmitted from an operating chamber to a storage chamber and vice-versa, whereby the power transmitting characteristics of the coupling can be controlled by displacement of fluid from one chamber to the other. This invention is directed specifically to the temperature sensitive fluid transfer control assembly which is utilized to effect control of the displacement of fluid from one chamber to the other.

This novel device is disclosed as being adapted particularly for use as a driving mechanism for transmitting power to the cooling fan of a heat engine but is adaptable for use in other environments in conjunction with or separate from an engine cooling fan.

In power transmitting couplings utilizing storage chambers for partially or completely displacing fluid from an operating chamber to thereby vary the power transmitting effectiveness of the clutch or coupling, various control devices have been utilized for fluid admission or removal from or to the operating chamber. Notably, control means have been utilized which sense or are responsive to the ambient temperature or temperature of the air which surrounds the housing of the power transmitting fluid coupling and such temperature sensing means is appropriately connected with control means in the coupling to allow the flow of fluid from one chamber to the other.

In such devices which are responsive to ambient temperature, undesirable operating characteristics are obtained since the fan often operates at relatively high speed during operating conditions when lower fan speed is desired, and vice-versa.

For example, when the vehicle engine is accelerating at a very rapid rate, it is not ordinarily desirable for the fan to increase at a speed which is nearly directly proportional to engine speed. However, when coupling control is effected by outside temperature, the outside temperature changes little, if any, during such rapid engine acceleration and the fan speed increases to a level which is undesirably high. This condition is referred to as "overshoot." Such condition can be remedied by the new and novel structure which is disclosed herein; namely, controlling the volume of fluid in the operating chamber by sensing the temperature of the viscous fluid in the coupling. It is an inherent characteristic of the controlled viscous shear clutch of the type disclosed herein for the slip speed, that is, the relative angular velocity of the input to the output member, to increase as input speed increases. This results in increased internal friction due to the increase in slip of the relatively rotatable members and the creation of more heat which results in higher fluid temperatures. By thus sensing the higher fluid temperature, the fluid transfer control assembly is modulated to increase the volume of fluid in the operating chamber.

Another undesirable condition which is encountered when ambient temperature alone is sensed to control volumetric flow to the operating chamber, is during the operation of the vehicle during cold start conditions. Under such conditions, a substantial amount of fluid is disposed in the operating chamber when the vehicle is started and the cold fluid has a relatively high viscosity. The relatively large volume of cold fluid in the operating chamber results in minimum slip of the fluid coupling assembly and slow evacuation of the fluid allows this undesirable condition to continue. Under such conditions, minimum cooling is required.

However, when internal temperature or fluid temperature is sensed under such operation conditions, the operating chamber is substantially evacuated at relatively low fluid temperatures when discharge orifice control means is utilized. This results in much quieter fan operation because of the lower fan speed and effects the desired cooling characteristic.

Still another undesirable operating characteristic which is obtained by only utilizing ambient temperature sensing means is during conditions when the ambient temperature is high and the vehicle is moving slowly or stopped. Under such conditions, there is no ram air effect and the ambient temperature rises, thus effecting substantially full engagement of the fan. However, very little additional cooling is effected at that time because the engine is idling and consequently, the fan is operating at low speed. Then, when the vehicle is rapidly accelerated, fan noise is very high. With the instant novel device, the fan operates at a lower relative speed during such acceleration and fan noise is minimized.

It is sometimes desirable to utilize the combination of ambient temperature sensing means with internal temperature sensing means to effect a desired torque transmitting characteristic. For example, with such a combination of temperature control means, torque transmitted by the coupling can be regulated to a nearly constant value regardless of the temperature of the viscous shear operating fluid. In couplings heretofore known in the art, fluid viscosity changes result in a varying torque output according to ambient temperature and such varying torque output becomes more pronounced due to the large amount of slip heat which is built up inside the coupling. Therefore, such known couplings overdrive when cold and underdrive while hot.

Various combinations can be obtained so that the ambient temperature sensing means overcontrols the internal sensing means or the internal temperature sensing means overcontrols the ambient sensing means, depending upon their respective temperature settings.

In the structural environment of a viscous shear fluid coupling utilizing an operating chamber, a storage chamber and a fluid transfer control assembly to control the volume of fluid which is operatively disposed in the operating chamber, it is an object of this invention:

(1) To provide a fluid regulating means to control the volume of fluid in the operating chamber by sensing the temperature of the viscous shear fluid in the coupling.

(2) To provide a fluid transfer control assembly for sensing the temperature of viscous shear fluid in the coupling in combination with control means for sensing the temperature of the ambient air surrounding the coupling assembly.

(3) To provide means for effecting inter-related modulation of the ambient temperature sensing means and the viscous shear fluid temperature sensing means so that a desired torque transmitting characteristic of the fluid coupling can be obtained.

(4) To provide bi-metallic temperature sensing means to regulate the flow of viscous fluid from the operating chamber to the storage chamber or vice-versa.

These and other objects and advantages of the invention will appear from the following description taken with the drawings which form a part of the specification and in which:

FIGURE 1 is a plan view of the viscous coupling assembly with a portion of the device being cut away.

FIGURE 2 is a partial cross-section taken on 2—2 of FIGURE 1.

FIGURE 3 is an enlarged view of a portion of the structure shown in FIGURE 2.

FIGURE 4 is a partial cross-section taken on 4—4 of FIGURE 1.

FIGURE 5 is a modification of the invention disclosed herein.

FIGURE 6 is a further modification of the invention.

FIGURE 7 is still a further modification of the invention shown and described herein.

Briefly, this invention includes a fluid viscous shear type of torque transmitting coupling having a storage chamber for the viscous fluid and an operating chamber wherein adjacent driving and driven members are in drive transmitting relationship through the viscous shear action of the fluid disposed therebetween. More specifically, the invention relates to means for controlling the displacement of viscous fluid from the operating chamber to the storage chamber and/or the displacement of fluid from the storage chamber to the operating chamber. In one embodiment of the invention, a bi-metallic temperature sensing means is disposed within the chamber assembly and is positioned to control the displacement of fluid from the storage chamber to the operating chamber in response to temperature changes of the fluid therein. Another embodiment of the invention utilizes the bi-metallic temperature sensing means to control the displacement of fluid from the operating chamber to the storage chamber. Both of these embodiments, in effect, control the volume of fluid within the operating chamber, but in one embodiment, such control is effected by temperature responsive valve means on the inlet opening and in the other embodiment, the temperature responsive means is disposed to control the discharge opening. For purposes of description in this specification, the inlet opening is defined as the opening which provides a passage for the displacement of fluid from the storage chamber to the operating chamber and the discharge valve or opening is defined as the means to provide for displacement of fluid from the operating chamber to the storage chamber.

For some applications, it is desirable to utilize a temperature responsive means disposed in the environment of the viscous shear fluid in combination with a temperature responsive means which is responsive to ambient temperature. Various combinations of control features can be effected by various arrangements of the viscous fluid temperature response means and the ambient temperature responsive means. However, certain functional advantages are obtained when the viscous fluid temperature responsive means is disposed in a position to control the displacement of fluid at the discharge opening and such functional advantage will be more readily apparent when the description which is hereinafter set forth is considered.

Reference to the drawing is made for a more detailed description of the device disclosed wherein FIGURE 1 illustrates the novel viscous drive assembly for use as a driving means for an engine cooling fan. A viscous fluid shear coupling or clutch means 10 is comprised of a driving structure 12 including a pulley 14 which is connected to a flange portion 16 and a hub plate 18 by bolts or other suitable connecting means 20. A support member 22 supports a mounting shaft 24 which is in turn mounted by a force or press fit in flange portion 16 and hub plate 18. The unsupported end of mounting shaft 24 extends into an opening 26 in shaft flange portion 16 and shaft 24 is free to rotate relative to member 22. A pulley 14 is adapted to be driven by a belt from the vehicle engine (not shown) so that the pulley functions as an input driving means for coupling 10.

A driving shaft means 28 is formed integral with shaft flange portion 16 and is provided with an intermediate portion 30 which supports the inner race of ball bearing assembly 32. A shoulder 34 functions as an abutment for ball bearing 32 in one axial direction and a further shaft portion 36 is provided with a surface serration and functions in combination with shaft portion 40 to support a clutch driving member 42 for rotation with shaft 28.

Clutch driving member 42 is comprised of a hub portion 44 and a flange or plate portion 46 which in turn provided with a plurality of concentric annular coupling lands 48 formed on flange portion 46. The hub portion 44 includes an annular hub opening 50 which has an interference fit with shaft portion 40 and knurled portion 36 to effect a conjoint driving relationship between shaft 28 and clutch driving member 42. A surface portion 52 of hub 44 abuts the inner race of bearing assembly 32 to axially confine the bearing assembly. With this arrangement, bearing assembly 32 is confined in both axial directions by shoulder portions 34 and 52, respectively. An undercut is provided at 54 to insure abutment between thrust surface 52 of hub 44 and the end surface of the inner race of bearing assembly 32.

An annular recess 56 is formed in the front face of the plate or face portion 46 of clutch driving member 42 and a plurality of circumferentially spaced, axially directed holes 58 terminate in annular recess 56. The holes 58 provide a path for the flow of fluid to and from the space between the lands and the space in front of driving member 42.

A coupling body or housing member 62 includes a hub surface portion 64 supported on the outer race of ball bearing assembly 32. A shoulder portion 66 is in abutting relationship with an end surface of the outer race of bearing assembly 32 and functions to axially position the housing member.

Concentric annular lands 74 are formed on coupling body member 62 and extend in an axial direction so that lands 74 are in axially overlapping relationship with coupling lands 48 of driving clutch member 42. With this arrangement, the grooves disposed between the lands of one of the members receive the lands of the other member to thus provide substantial shear surface portions in cooperation with the viscous fluid disposed therebetween. When a suitable viscous shear fluid is provided in the operating chamber, which is formed between the shear surfaces on the adjacent driving member and housing member respectively, torque is transmitted from one member to the other by the shear action of the viscous fluid disposed therebetween. In order to satisfactorily practice this invention, a clearance between the adjacent surfaces formed by lands 48 and 74, respectively, is on the order of up to .010", but, of course, this clearance is not extremely critical and is a function of shear characteristics of the fluid which is utilized. When this device is in operation, housing member 62 is supported by bearing assembly 32 and a fluid bearing which is formed by the peripheral portion of the driving member and a cooperative companion surface portion of the housing member at 75. This structure is disclosed in detail in United States Patent No. 2,948,268 and does not form any part of the present invention.

A combination cover and fluid storage assembly means 76 is comprised of an exterior or cover plate 78 and a valve or pump plate 80 disposed axially intermediate cover plate 78 and driving member 42. Cover plate 78 and valve plate 80 cooperate to define a fluid storage chamber 82. Valve plate 80 is confined in an annular recess 84 provided in coupling body member 62 to retain the valve plate in assembly therewith and cover plate 78 abuts the periphery of valve plate 80 along an anular surface 86 to thus retain valve plate 80 in an axially confined position with respect to cover plate 78 and coupling body member 62. A spun-over or crimped portion 88 retains cover plate 78 in an assembled relationship with coupling body member 62 and on O-ring seal 90 functions to retain the viscous shear fluid within the operating assembly without any leakage. The abutting surface portion 86 between cover 78 and valve plate 80 prevents relative rotation between valve plate 80 and cover plate 78 but suitable positive means can be provided to prevent rotation, if the provision of such means is desired.

Referring to FIGURES 1 and 2, valve and valve control assembly 92 is comprised of a valve mounting shaft 94 supported in cover plate 78 for rotation with respect to the cover plate and in fluid sealing relationship therewith. A thermostatic mounting clip 96 is attached to cover plate 78 by suitable means such as spot welds or resistance welds.

Out-turned flanges 98 form an integral part of mounting clip 42 and are provided with central notches or recesses 100. Helically wound bi-metallic thermostatic element 102 is provided with an in-turned end portion 104 which is receivable in a transverse slot disposed in shaft 94. An out-turned end portion 106 is selectively receivable in either of slots 100 depending upon the desired adjusted position of the thermostatic element. A valve arm 108 is mounted on the inward end of and for conjoint rotation with shaft 94 and is disposed adjacent to valve plate 80. With this arrangement, a change in ambient temperature results in rotation of shaft 94 and valve arm 108.

A fluid inlet opening means 110 is formed in valve plate 80 to allow the displacement of fluid from the storage or reservoir chamber to the operating chamber. Fluid inlet means 110 is disposed with respect to valve arm 108 such that when valve arm 108 is rotated by operation of bi-metallic thermostatic element 102, fluid inlet opening means 110 is either completely covered, partially covered, or completely uncovered, depending upon the actuated position of the thermostatic element.

A linear bi-metalic thremostatic element 112 is suitably attached at 114 as by spot welding to a projected portion of pump plate 80 and is disposed in the environment of the viscous shear fluid so that in response to changes in temperature of the viscous shear fluid, linear bi-metallic thermostatic element 112 is modulated between the solid line positions as shown in FIGURE 4 and the dotted line position as illustrated. It is noted that the valve arm 108 is disposed between valve plate 80 and linear bi-metallic thermostatic element 112 in slideable relation therebetween so that valve arm 108 is movable substantially independent of linear bi-metallic thermostatic element 112. In the embodiment illustrated in FIGURE 1, bi-metallic element 112 is positioned so that it covers a substantial portion of inlet opening 110 but a portion of inlet opening 110 is left exposed so that even when bi-metallic element 112 is disposed in close relationship with inlet opening 110, a portion of the inlet opening is still exposed for the flow of fluid therethrough. This arrangement allows for some flow of fluid through the inlet opening and thus allows bi-metallic element 112 to sense the true temperature of the fluid in the viscous shear environment since there will be a constant basic flow of fluid from the operating chamber to the storage chamber to thus provide an immediate response by bi-metallic element 112 to the operating temperature of the fluid in the operating chamber.

An impact pump means 116 is formed in the valve plate 80 and in the embodiment shown, the pumping element is drawn or formed in the shape of a projecting circular portion. In assembly, the pumping element is disposed in annular recess 56 so that during relative rotation of the valve plate with respect to driving member 42, a positive pressure is created on the leading side of the pumping element and the effectiveness of the pump is determined by the clearances of the annular projecting portion with respect to the wall portions of recess 56.

A fluid discharge opening means 118 is formed in pump plate 80 and is positioned ahead of impact pumping element 116 in the direction of rotation of valve plate 80. Fluid discharge means 118 is poistioned radially between the inner and outer wall portions of annular recess 56. With this arrangement, creation of a positive pressure ahead of impact pumping element 116 results in fluid being pumped under pressure from the operating chamber to the storage chamber through fluid discharge opening means 118.

A substantial portion of the structure heretofore described forms only an environmental portion of this invention; more specifically, the novel improvement disclosed herein relates to the temperature responsive means for controlling the displacement of fluid between the operating chamber and the storage chamber through appropriate positioning of such thermostatic means either on the inlet opening means, the discharge opening means or on both said opening means. The remaining portion of the environmental structure disclosed herein is described in United States patent application Ser. No. 812,479, filed May 11, 1959, now U.S. Patent No. 3,055,473 entitled "Fluid Coupling Device."

FIGURE 5 illustrates a modification of the structure heretofore described. The essential structural details disclosed in FIGURE 1 are also cooperative with the modified structure shown in FIGURE 5 except that in this modified structure, no external temperature sensing means is provided; that is, the valve and valve control assembly 92 is eliminated and the sole means which is provided for controlling the flow of fluid from one chamber to another is the viscous fluid temperature sensing means disposed over the inlet opening. Specifically, a linear bi-metallic temperature responsive means 212 is suitably connected as by a spot weld means at 214, to a projected portion of pump plate 280 and is arranged to control the volume of fluid which flows from the storage chamber to the operating chamber through inlet opening means 210.

An impact pump means 216 is disposed in cooperative relationship with discharge opening means 218 and the device is similar to the structure disclosed in FIGURE 1 except for the modification of the fluid transfer control assembly as heretofore noted. With this arrangement, the flow of fluid from the storage chamber to the operating chamber is controlled solely by linear bi-metallic temperature responsive means 212 which is controlled and responds directly to the temperature of the viscous shear fluid disposed in the operating medium of the clutch. In an indirect sense, this embodiment also senses ambient temperature in that after the device has been shut down for some time, the temperature of the fluid will gradually become the same as ambient temperature. However, during operating conditions, the displacement of fluid from the storage chamber to the operating chamber is controlled as a function of the change in temperature of the viscous shear fluid.

A further modification is disclosed in FIGURE 6 wherein an external temperature sensing means is provided and includes a valve arm 308 which is responsive to ambient temperature in the same manner as the structure disclosed in FIGURE 1. The embodiment as disclosed in FIGURE 6 is also provided with a linear bi-metallic temperature responsive means 320 suitably mounted as by spot welding at 322 to a projected portion of pump plate 380 so that linear bi-metallic means 320 is responsive to the temperature of the viscous shear fluid disposed in the operating environment of the clutch. Bi-metallic element 320 is disposed in flow controlling relationship with respect to discharge opening means 318 so that as the temperature of the viscous shear fluid in the operating chamber rises, bi-metallic element 320 moves to a position to reduce the flow of fluid from the operating chamber to the storage chamber thus providing a greater volume of fluid in the operating chamber.

A further embodiment is disclosed in FIGURE 7 wherein the pump plate 480 is provided with an impact pump means 416 and a discharge opening means 418 similar to the structure heretofore described. Also, a linear bi-metallic means 420 is appropriately connected at 422 to a projecting portion of pump plate 480. Linear bi-metallic element 420 is disposed in flow controlling relationship with respect to discharge opening means 418 so that as the temperature of the fluid in the operating environment of the clutch rises, linear bi-metallic element 420 moves to a position to restrict the flow rate of fluid from the operating chamber to the storage chamber in response to an increase in temperature. When the temperature of the viscous shear fluid increases a sufficient amount, the flow of viscous fluid from the operating chamber to the storage chamber is reduced to a minimum rate of flow.

In considering a typical operating cycle of the several embodiments heretofore described, it is noted that these devices provide for the displacement of fluid from one chamber to the other by providing a fluid transfer control assembly which senses the temperature of the viscous shear fluid and in response to such temperature, controls the rate of flow of such fluid from one chamber to the other. The rate of flow of the fluid is modulated by varying the effective inlet orifice or discharge orifice between the chambers.

A typical operating cycle of the structure disclosed in FIGURE 1 is set forth as follows. Assuming the device has been shut down for a period of time, the coupling assembly will be at ambient temperature. At this time, fluid will be disposed in both the operating chamber and the storage chamber and will be accumulated at substantially the same level in both chambers.

Also, at this time, due to the relatively low temperature, valve arm 108 will be in a substantially closed position with respect to inlet opening means 110 and linear bi-metallic element 112 will be disposed in close physical relationship with opening means 110, as illustrated in the solid line position in FIGURE 4. When the vehicle engine is started and the viscous coupling device commences operation, fluid in the operating chamber and in the storage chamber will be centrifuged to a toroidal configuration and pumping means 116 will commence discharging fluid through discharge opening means 118 into the storage chamber. Substantial evacuation of the fluid from the operating chamber will gradually be effected and slip speed of the coupling will increase due to the decrease of the volume of fluid in the operating chamber. This increased slip between the input and output members will create heat and raise the temperature of the viscous fluid thus moving linear bi-metallic element 112 away from inlet opening means 110. However, fluid flow from the storage chamber to the operating chamber will continue to be restricted until the ambient temperature conditions are such to move valve arm 108 to a position to increase the effective opening of inlet opening 110.

As the ambient temperature increases, valve arm 108 will move to a position to allow a greater opening in inlet opening means 110 and since fluid is constantly centrifuged in the reservoir chamber, the fluid spills through inlet opening means 110 into the operating chamber and is pumped from the operating chamber back to the storage chamber by pumping means 116 through discharge opening means 118. The volume of fluid in the operating chamber at any one time is determined by the rate of flow of fluid through the inlet opening 110 into the operating chamber and the rate of discharge of fluid from the operating chamber into the storage chamber through discharge opening means 118.

When the viscous fluid is evacuated from the operating chamber at a faster rate than it is admitted through inlet opening means 110, then the operating chamber will gradually be evacuated. When this relationship is reversed, viscous fluid will accumulate in the operating chamber and the total volume of fluid in the operating chamber will be determined by the difference in rate of flow through the inlet opening means 110 into the operating chamber as compared to the discharge rate of flow to the storage chamber through discharge opening means 118. With this arrangement, it is apparent that bi-metallic element 102 in combination with valve arm 108 can either be controlled by, or over-control linear bi-metallic element 112, depending upon the operating characteristics which are desired.

The embodiment shown in FIGURE 5 includes a fluid transfer control assembly which is responsive to viscous fluid temperature only. During a cold start condition, linear bi-metallic element 212 is disposed in intimate relationship with inlet opening means 210 and merely allows the basic flow of centrifuged fluid from the storage chamber into the operating chamber. Pumping means 216 gradually evacuates the static volume of fluid and the device thereafter operates at a relatively high slip. Under this high slip condition, heat is built up in the fluid at a relatively rapid rate and the viscous fluid temperature increases, thus moving linear bi-metallic element 212 away from inlet opening means 210 to allow a greater volume of fluid to flow from the reservoir to the operating chamber. Thereafter, the slip speed decreases due to the greater volume of fluid in the operating chamber and the discharge effectiveness of pump 216 is decreased due to the decrease in slip speed. During idle conditions, a minimum amount of frictional heat is built up in the fluid and the rate of dissipation of heat built up on the fluid is determined to some degree by the ambient temperature since a lower ambient temperature will allow heat built up in the viscous fluid to dissipate at a more rapid rate through the housing.

The modification illustrated in FIGURE 6 utilizes an ambient temperature responsive valve plate 308 which is cooperably disposed with respect to inlet opening means 310. Also, a linear bi-metallic element 320 is disposed cooperably with discharge opening means 318. With this arrangement, ambient conditions determine the rate of flow from the reservoir chamber to the operating chamber through inlet opening means 310 and fluid temperature conditions determine the rate of flow from the operating chamber to the storage chamber through discharge opening means 318.

The modification illustrated in FIGURE 7 utilizes a singular temperature responsive means in the form of a linear bi-metallic means 420 cooperably disposed with respect to discharge opening means 418. It is noted that the modification shown in FIGURE 7 and the heretofore described modification shown in FIGURE 6 utilize discharge opening means 318 and 418, respectively, which are illustrated as being of a relatively larger size than discharge opening means 118, 218, respectively. However, discharge opening means 318 and 418, respectively, are formed to have a relative effective size relationship with respect to the inlet opening means 310 and 410, respectively, and are not necessarily larger in actual size than the discharge opening means 118 and 218, respectively. This effective size relationship will be more apparent after considering a typical operating cycle of embodiments shown in FIGURES 6 and 7.

Referring to FIGURE 7, during a cold start condition, linear bi-metallic means 420 will be spaced from discharge opening means 418 to allow a relatively high rate of discharge flow of fluid from the operating chamber to the storage chamber and bi-metallic element 420 moves to a more intimate position with respect to discharge opening means 418 with an increase in fluid temperature. During a cold start condition, bi-metallic element 420 is positioned in spaced relationship with respect to discharge opening means 418. Since the area of discharge opening means 418 is relatively large, as soon as the device commences rotation, the static build-up of fluid will be rapidly displaced from the operating chamber to the storage chamber thus resulting in minimum fan speed with respect to input speed. This is a very desirable condition because during cold start conditions, a minimum amount of cooling is required and it is inherent in the devices disclosed in FIGURES 6 and 7 for the static build-up of fluid in the operating chamber to be rapidly exhausted or displaced through the discharge opening means into the reservoir because of the large size of the discharge opening. In the structures shown in FIGURES 1 and 5, this desirable condition is not obtainable to the extent as in the structures in FIGURES 6 and 7, because the rate of discharge through the discharge opening means 118 and 218, respectively, is affected only by the slip rate of the coupling and the viscosity of the fluid, whereas in structures in FIGURES 6 and 7, the effective size of the discharge opening means 318 and 418, respectively, is controllable. The cold start fan noise condition which has heretofore been mentioned, is therefore eliminated in the structures disclosed in FIGURES 6 and 7.

It is inherent in all of the modifications disclosed herein to prevent the heretofore mentioned over-shoot condition because such condition is the result of rapid acceleration of the fan drive due to rapid acceleration of the vehicle engine and ambient temperature conditions do not sense the over-shoot condition. When the output member of the fan drive accelerates at a commensurate rate with the input member, the cooling at that time is not particularly needed and the increase in fan noise during such acceleration period is extremely undesirable. In the embodiments shown in FIGURES 6 and 7, rapid acceleration results in an increase in viscous fluid temperature thus actuating linear bi-metallic means to a position to restrict flow from the operating chamber to the storage chamber and yield greater fan cooling. However, this functional change lags the acceleration and the relatively higher fan speeds are not effected during the acceleration but shortly thereafter. This greatly reduces fan noise problems.

In summary, the novel device disclosed herein includes a viscous drive assembly provided with an output member which operates at a desired speed substantially irrespective of the speed of the input member because the temperature of the operating fluid is sensed and effects control of the fluid transfer control assembly to thus maintain the output member at the desired speed.

While the present invention has been described in connection with certain specific embodiments, it is to be understood that the foregoing description is merely exemplary and that the concept of this invention is susceptible of numerous other modifications, variations and applications which will be apparent to persons skilled in the art. The invention is to be limited, therefore, only by the broad scope of the appended claims.

I claim:

1. In a rotatable power transmitting device;
   an input member;
   an output member disposed adjacent said input member;
   a fluid operating chamber formed between said members;
   means cooperating with one of said members to form a fluid storage chamber;
   viscous shear fluid means disposed in said storage chamber and adapted to be transferred to said operating chamber so that during rotation of said input member, said output member is driven by the viscous shear action of said viscous fluid;
   a fluid transfer control assembly including;
   means for displacing said fluid from said operating chamber to said storage chamber;
   means for displacing said fluid from said storage chamber to said operating chamber;
   and means directly exposed and responsive to the temperature of said viscous shear fluid for controlling the volume of fluid operative in said operating chamber.

2. A viscous fluid shear power transmitting devise including:
   a rotatable input member;
   a rotatable output member cooperatively disposed with respect to said input member;
   a fluid operating chamber formed between said members;
   a fluid storage chamber disposed adjacent said operating chamber;
   viscous shear fluid means disposed in said chambers and being transferable therebetween so that fluid in said operating chamber transmits torque by fluid shear between said members;
   a fluid transfer control assembly including;
   means for transmitting fluid from said operating chamber to said storage chamber;
   means for transmitting fluid from said storage chamber to said operating chamber;
   temperature responsive means directly exposed and responsive to the temperature of said fluid for controlling the displacement of fluid from one of said chambers to the other of said chambers so that the power transmitting effectiveness of the device is controlled.

3. In a fluid shear type power transmitting device;
   a rotatable input member;
   a rotatable output member positioned adjacent said input member and adapted to be driven thereby through fluid shear;
   a chamber assembly including a fluid operating chamber disposed between said members;
   a fluid storage chamber disposed adjacent said fluid operating chamber;
   viscous shear fluid means disposed in said chamber assembly and adapted to be transferable between said chambers;
   fluid delivery means including a first port means for delivering fluid from said operating chamber to said storage chamber;
   means including a second port means for delivering fluid from said storage chamber to said operating chamber;
   temperature responsive means directly exposed and responsive to the temperature of said fluid and cooperable with one of said port means to control the volume of fluid in said operating chamber and thereby modulate the coupling torque transmitting effectiveness.

4. A device according to claim 3 wherein said temperature responsive means is cooperably disposed with respect to said first port means.

5. A device according to claim 3 wherein said temperature responsive means is cooperably disposed with respect to said second port means.

6. A device according to claim 3 including a housing means, thermostatic means mounted on said housing means and being operable in response to temperature changes of ambient air surrounding said housing means;
   valve means operatively connected with said thermostatic means and being cooperably disposed with respect to said second port means so that changes in ambient temperature effect the modulation of said valve means to determine the volume of fluid in said operating chamber.

7. A device according to claim 6 wherein said temperature responsive means is cooperably disposed with respect to said first port means.

8. A device according to claim 6 wherein said temperature responsive means is cooperably disposed with respect to said second port means.

9. In a fluid shear type power transmitting device;
   a rotatable input member;
   a rotatable output member positioned adjacent said input member and adapted to be driven thereby through fluid shear;
   a chamber assembly including a fluid operating chamber cooperably disposed with said members;
   a fluid storage chamber cooperably disposed with said fluid operating chamber;
   viscous shear fluid means disposed in said chamber assembly and adapted to be transferable between said chambers;
   fluid delivery means including discharge port means for delivering fluid from said operating chamber to said storage chamber;
   means including inlet port means for delivering fluid from said storage chamber to said operating chamber;
   temperature responsive means disposed in one of said chambers and cooperably disposed with said discharge port means to move toward or away from said discharge port means in response to changes in temperature of said viscous shear fluid to thereby modulate the flow of said viscous shear fluid through said discharge port means and control the volume of fluid in said operating chamber.

10. In a fluid shear type power transmitting device;
a housing;
a rotatable input member;
a rotatable output member positioned adjacent said input member and adapted to be driven thereby through fluid shear;
a chamber assembly including an operating chamber disposed between said members;
a fluid storage chamber disposed adjacent said fluid operating chamber;
viscous shear fluid means disposed in said chamber and adapted to be transferable between said chambers;
fluid delivery means including a first port means for delivering fluid from said operating chamber to said storage chamber;
means including a second port means for delivering fluid from said storage chamber to said operating chamber;
means responsive to the temperature of said viscous shear fluid and being disposed in one of said chambers;
fluid transfer control means including one of said port means and said fluid temperature responsive means for controlling the volume of fluid in said operating chamber;
ambient temperature responsive means disposed externally of said housing;
and means controlled by said ambient temperature responsive means and being cooperably disposed with said second port means to control the displacement of fluid from said storage chamber to said operating chamber.

11. A device according to claim 10 wherein said fluid transfer control means includes said first port means.

12. A device according to claim 10 wherein said fluid transfer control means includes said second port means.

13. In a fluid shear type power transmitting device;
a rotatable input member;
a rotatable output member encompassing said input member and adapted to be driven thereby through fluid shear;
a chamber assembly including a fluid operating chamber disposed between said members;
a fluid storage chamber disposed adjacent said fluid operating chamber;
plate means separating said chambers;
fluid means disposed in said chamber assembly and adapted to be transferable between said chambers;
fluid delivery means for delivering fluid from said operating chamber to said storage chamber and including a discharge port means on said plate means;
means for delivering fluid from said storage chamber to said operating chamber and including an inlet port means on said plate means;
fluid temperature responsive means disposed on said plate means in one of said chambers and directly exposed and responsive to the temperature of said fluid to move toward and away from said discharge port means and in fluid flow modifying relationship therewith to allow for a rapid fluid evacuation of said operating chamber during relatively low fluid operating temperatures.

14. A viscous fluid shear power transmitting device including:
a rotatable input member;
a rotatable output member cooperatively disposed with respect to said input member;
a fluid operating chamber formed between said members;
a fluid storage chamber disposed adjacent said operating chamber;
viscous shear fluid means disposed in said chambers and being transferable therebetween so that fluid in said operating chamber transmits torque by fluid shear between said members;
a fluid transfer control assembly including:
    means for transmitting fluid from said storage chamber to said operating chamber;
    means for transmitting fluid from said operating chamber to said storage chamber including fluid temperature responsive means being modulatable in response to changes in viscous shear fluid temperature to provide a rapid reduction in the volume of fluid in the operating chamber during relatively low fluid operating temperatures.

References Cited
UNITED STATES PATENTS

| | | | |
|---|---|---|---|
| 2,777,303 | 1/1957 | Slattery | 236—93 X |
| 2,902,127 | 9/1959 | Hardy | 192—58 |
| 3,055,473 | 9/1962 | Oldberg et al. | 123—41.12 X |
| 3,155,209 | 11/1964 | Weir | 192—58 |

DONLEY J. STOCKING, *Primary Examiner.*

DAVID J. WILLIAMOWSKY, *Examiner.*

F. R. HANDREN, A. T. McKEON, *Assistant Examiners.*